ically useful chemical intermediates. For example, they are used as intermediates in the preparation of cyclic lactams such as caprolactam.

United States Patent [19]
Kablaoui et al.

[11] 3,895,072
[45] July 15, 1975

[54] PREPARATION OF NITROCYCLOALKANONES

[75] Inventors: Mahmoud S. Kablaoui, Wappingers Falls; Donald R. Lachowicz, Fishkill, both of N.Y.

[73] Assignee: Texaco Inc., New York, N.Y.

[22] Filed: May 9, 1973

[21] Appl. No.: 358,764

Related U.S. Application Data

[62] Division of Ser. No. 206,195, Dec. 8, 1971, abandoned.

[52] U.S. Cl. ........ 260/586 P; 260/466; 260/586 M; 260/590
[51] Int. Cl. .......................................... C07c 45/04
[58] Field of Search............ 260/586 R, 586 A, 590

[56] References Cited
UNITED STATES PATENTS
3,466,326  9/1969  Lachowicz et al. ......... 260/586 R X 3,806,547  4/1974  Pivawer .............................. 260/586

*Primary Examiner*—Bernard Helfin
*Assistant Examiner*—Norman Morgenstern
*Attorney, Agent, or Firm*—T. H. Whaley; C. G. Ries; George J. Darsa

[57] ABSTRACT

A method of preparing nitrocycloalkanones by simultaneously contacting a solution containing a cycloalkene, a denitrating agent and an organic solvent with a mixture of dinitrogen tetroxide and oxygen, the mole ratio of denitrating agent to cycloalkene being above 0.1:1 and up to about 2:1, preferably about 0.5:1 to 1:1, as a one step nitrooxidation reaction. The nitrocycloalkanones so formed are useful as fuel and lubricant additives as well as intermediates in the preparation of cyclic lactams such as caprolactam.

14 Claims, No Drawings

PREPARATION OF NITROCYCLOALKANONES

This is a division of our co-pending application Ser. No. 206,195, filed 12/8/71, now abandoned.

BACKGROUND OF THE INVENTION

This invention relates to a method for preparing nitrocycloalkanones from cyclic olefins. In particular, this invention relates to a method for preparing alpha-nitrocycloalkanones from cyclic olefins through a one step nitrooxidation reaction.

Heretofore, nitrocycloalkanones were prepared by initially contacting a cycloalkene with a mixture of dinitrogentetroxide and oxygen to form a nitroperoxynitrate followed by second stage where the nitrate was contacted with a denitrating agent as exemplified in U.S. Pat. No. 3,466,326. A disadvantage in the prior art was the requirement that a two stage reaction procedure be employed. Such a method involving a plurality of stages consequently resulted in penalties in terms of economics and ultimately in the commercial attractiveness of the process.

It is therefore an object of this invention to provide a direct method for the preparation of nitrocycloalkanones.

It is another object of this invention to provide a method for the preparation of nitrocycloalkanones from cyclic olefins by a one step nitrooxidation reaction.

Yet another object of this invention is to provide a method for the preparation of nitrocycloalkanones in high yields.

A further object of this invention is to provide a more economical method for the preparation of nitrocycloalkanones by providing a means for employing low levels of denitrating agent.

Other objects and advantages will become apparent from a reading of the following detailed description and examples.

SUMMARY OF THE INVENTION

Broadly, this invention contemplates a method of preparing nitrocycloalkanones which comprises simultaneously contacting a solution containing a cycloalkene of the formula:

where R is a polymethylene radical of from three to 22 carbons or a substituted polymethylene radical of four to 22 carbons containing one or more substitutents selected from the group consisting of alkyl and aryl, a denitrating agent and an aprotic organic solvent with dinitrogen tetroxide and oxygen, where the mole ratio of said denitrating agent to said cycloalkene is above 0.1:1 and up to about 2:1, preferably about 0.5:1 to 1:1, thereby forming a nitrocycloalkanone corresponding to the formula:

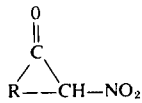

where R is as heretofore defined.

According to this invention the contemplated nitrocycloalkanones are derived from cycloalkenes illustrated but not limited to cyclopentene, 3-methylcyclopentene, cyclohexene, 4-methylcyclohexene, cycloheptene, 4-phenylcyclohexene, cyclooctene, cyclodecene, cyclododecene, 4-pentylcyclotetradecene, cyclooctadecene, cycloeicosene and cyclodocosene. Mixtures of cycloalkenes such as a mixture of 3-methylcyclohexene, 4-methylcyclohexene and cycloheptene or a mixture of cyclohexene, methylcyclohexene, ethylcyclohexene, methylethylcyclohexene and trimethylcyclohexene are similarly contemplated.

The conversion of the cycloalkene by the instant method to the corresponding nitrocycloalkanone is accomplished by forming a solution composed of the cyclic olefin, a denitrating agent and an organic solvent and contacting the solution with a mixture of dinitrogen tetroxide and oxygen at a temperature between about 0° to 40°C., preferably from 5° to 15°C. Temperatures in excess of 40°C. are undesirable because of the threat of explosion and temperatures below 0°C. require excessive refrigeration thereby rendering the process economically unattractive.

The mole ratio of the individual components in the instant invention represents an important aspect insofar as providing a process leading to high yields of the desired product. Specifically, the mole ratio of cycloalkene to oxygen to dinitrogen tetroxide in the single step nitrooxidation reaction is maintained between about 1:1:0.5 and 1:30:1.5. Unexpectedly, it has been found that the presence of an aprotic organic solvent permits the mole ratio of denitrating agent to cycloalkene during the nitrooxidation reaction to be maintained at levels heretofore considered inoperatively low. We have found that when conversion is conducted in the presence of the organic solvent, a significant economic benefit is realized in that lesser amounts of costly denitrating agent are needed, whereas in the absence of solvent amounts of denitrating agent several times that employed herein would be required to provide results comparable to that realized by the instant method. Ratios of denitrating agent below that specified above are undesirable because of the formation of by-products such as nitronitrates and nitroalcohols and the presence of the denitrating agent in amounts exceeding that specified results in excessive loses of agent which loses may be reduced but not eliminated through the use of extensive separation and recovery procedures. The reaction time is generally between about one-half and 5 hours although longer and shorter periods may be employed depending on the amount and rate of addition of dinitrogen tetroxide.

It will be appreciated that the nitrating agent, dinitrogen tetroxide, is an equilibrium mixture of dinitrogen tetroxide and nitrogen dioxide with the equilibrium driven essentially to 100 percent dinitrogen tetroxide at 0°C. and essentially 100 percent nitrogen dioxide at 140°C. The term dinitrogen tetroxide as used herein denotes the equilibrium mixture as well as the pure $N_2O_4$ compound.

Oxygen employed in the instant invention may be in pure form or diluted with air or in admixture with inert gases such as nitrogen or argon.

In the practice of the instant invention, the cycloalkene and denitrating agent are admixed with an aprotic organic solvent having a boiling point between about 30° to 100°C. Protic solvents should be avoided in that their use results in the formation of mixtures composed of nitroketone, nitronitrate and nitroalcohol. The ratio of aprotic organic solvent to cycloalkene employed can range from 2:1 to 20:1 parts by weight. By employing the specified solvent, an additional benefit is imparted to the instant method in that nitroketone recovery from the reaction mixture is facilitated and may be accomplished by means of distillation and extraction. Illustrative of the solvents which can be utilized in the instant method we mention n-hexane, n-heptane, carbon tetrachloride, diethylether, benzene and petroleum ether. Thereafter, dinitrogen tetroxide along with oxygen is introduced to the solution containing the cycloalkene, denitrating agent and solvent at rate of between about 0.01 and 0.1 gram per minute per gram of cycloalkene.

Among the denitrating agents contemplated in the instant invention are those selected from the group consisting of

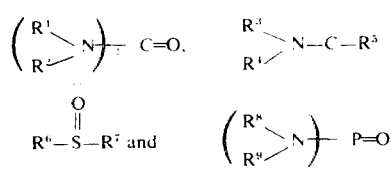

where $R^1$, $R^2$, $R^6$, $R^7$, $R^8$ and $R^9$ are alkyl of from one to five carbon and $R^3$, $R^4$ and $R^5$ are hydrogen or alkyl of from one to five carbons. Specific examples of denitrating agent contemplated herein are dimethyl formamide, diethyl formamide, dimethyl actamide, dimethyl sulfoxide, diethyl sulfoxide, tetramethylurea, tetraethylurea and hexamethylene phosphoramide. In addition other denitrating agents such as 1-methyl-2-pyrrolidinone can be used. Particularly preferred denitrating agents are dimethyl formamide, dimethyl sulfoxide and 1-methyl-2-pyrrolidinone.

Specific examples of the nitrocycloalkanones prepared by instant process include 2-nitrocyclopentanone, 2-nitrocyclohexanone, 2-nitrocycloheptanone, 2-nitro-3-methylcylcopentanone, 2-nitro-4-methylcyclohexanone, 2-nitro-4-phenylcyclohexanone, 2-nitrocyclooctanone, 2-nitrocyclodecanone, 2-nitrocyclododecanone, 2-nitro-4-pentylcyclotetradecanone, 2-nitrocyclooctadecanone, 2-nitrocycloeicosanone and 2-nitrocyclodocosanone.

The nitrocycloalkanones prepared according to this invention are useful as fuel and lubricant additives. Further there are useful as intermediates in the preparation of aminoacids, nitroacids, nitroesters and cyclic lactams, such as caprolactam.

In order to more fully illustrate the nature of our invention and the manner of practicing the same of the following examples are presented.

EXAMPLE I

Into a 200 milliliter flask equipped with a condenser, gas inlet and thermometer, there was charged 16.6 grams (0.1 mole) of cyclododecene, 7.3 grams (0.1 mole) of dimethyl formamide and 100 milliliters of carbon tetrachloride. To this solution maintained at a temperature of 5° to 10°C. there was introduced oxygen at the rate of from 60 to 80 milliliters per minute and 9.2 grams (0.1 mole) of dinitrogen tetroxide at the rate of 0.05 milliliters per minute over a period of 2 hours. At the end of the dinitrogen tetroxide-oxygen addition period the carbon tetrachloride was removed from the reaction zone by distillation under a pressure of 20 to 100 mm/Hg. The residue was added to 100 milliliters of water and extracted four times with 50 milliliter portions of diethylether, thereafter dried over magnesium sulfate and the ether stripped by distillation under a pressure of 100 to 760 mm/Hg. The product, 21.8 grams, corresponding to a yield of 96 percent, was determined by spectral analysis to be pure 2-nitrocyclododecanone. No by-products were detected.

EXAMPLE II

Example I above was repeated except that 3.65 grams (0.05 mole) of dimethyl formamide were used. There was recovered 20.4 grams of 2-nitrocyclododecanone corresponding to a yield of 90 percent along with approximately 5 to 10 percent 2-nitrocyclododecyl nitrate.

EXAMPLE III

Example I was repeated except that 0.73 gram (0.01 mole) of dimethyl formamide was used. A 50 percent yield (11.3 gram) of 2-nitrocyclododecanone was recovered and the residue contained equal amounts of 2-nitrocyclododecyl nitrate and 2-nitrocyclododecyl alcohol.

EXAMPLE IV

Example I was repeated except that 14.6 grams (0.2 mole) of dimethyl formamide was used and the reaction was conducted at a temperature of 10° to 15°C. A 90 percent yield (20.4 grams) of 2-nitrocyclododecanone was isolated.

EXAMPLE V

The procedure of Example IV was repeated expect that 19.8 grams (0.2 mole) of 1-methyl-2-pyrrolidinone was employed in place of dimethyl formamide. There was recovered 19.3 grams of 2-nitrocyclododecanone corresponding to a yield of 85 percent.

EXAMPLE VI

The procedure of Example I was followed except that 8.2 grams (0.1 mole) of cyclohexene was employed and conversion was conducted at a temperature of from 0° to 5°C. A 90 percent yield (12.8 grams) of 2-nitrocyclohexanone was recovered.

EXAMPLE VII

The procedure of Example VI was followed except that 11.7 grams (0.15 mole) of dimethyl sulfoxide were employed as denitrating agent. An 85 percent yield (12.07 grams) of 2-nitrocyclohexanone was recovered.

EXAMPLE VIII

The procedure of Example I was followed employing 11.0 grams (0.1 mole) of cyclooctene, 14.6 grams (0.2 mole) of dimethyl formamide and 100 milliliters of carbon tetrachloride. A yield of 90 percent (12.8 grams) of 2-nitrocyclooctanone was isolated.

We claim:

1. A method of preparing nitrocycloalkanones which comprises simultaneously contacting a solution containing a cycloalkene of the formula:

where R is a polymethylene radical of from three to 22 carbons or a substituted polymethylene radical of four to 22 carbons containing one or more substituents selected from the group consisting of alkyl and aryl, a denitrating agent selected from the group consisting of:

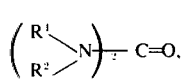 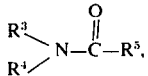

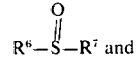 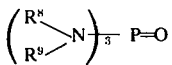

where $R^1$, $R^2$, $R^6$, $R^7$, $R^8$ and $R^9$ are alkyl of from one to five carbons and $R^3$, $R^4$ and $R^5$ are hydrogen or alkyl of from one to five carbons and an aprotic organic solvent having a boiling point of between about 30° and 100°C. with dinitrogen tetroxide and oxygen at a temperature between about 0° to 40°C., where the mole ratio of said denitrating agent to said cycloalkene is about 0.5:1 to 1:1 and the ratio of aprotic organic solvent to cycloalkene is from 2:1 to 20:1 parts by weight thereby froming a nitrocycloalkanone corresponding to the formula:

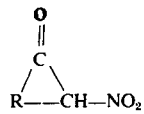

where R is as heretofore defined.

2. A method according to claim 1 wherein said denitrating agent is dimethyl formamide.

3. A method according to claim 1 wherein said denitrating agent is dimethyl sulfoxide.

4. A method according to claim 1 wherein said cycloalkene is cyclohexene.

5. A method according to claim 1 wherein said cycloalkene is cyclooctene.

6. A method according to claim 1 wherein said cycloalkene is cyclodecene.

7. A method according to claim 1 wherein said cycloalkene is cyclododecene.

8. A method according to claim 1 wherein said contacting is conducted at a temperature between about 5° to 15°C.

9. A method according to claim 1 wherein said nitrocycloalkanone is 2-nitrocyclohexanone.

10. A method according to claim 1 wherein said nitrocycloalkanone is 2-nitrocyclooctanone.

11. A method according to claim 1 wherein said nitrocycloalkanone is 2-nitrocyclodecanone.

12. A method according to claim 1 wherein said nitrocycloalkanone is 2-nitrocyclododecanone.

13. A method according to claim 1 wherein said solvent is carbon tetrachloride.

14. A method according to claim 1 wherein said solvent is benzene.

* * * * *